United States Patent
Peck-Walden et al.

(10) Patent No.: US 11,861,708 B2
(45) Date of Patent: Jan. 2, 2024

(54) CONSERVATION OF ELECTRONIC COMMUNICATIONS RESOURCES VIA SELECTIVE PUBLICATION OF SUBSTANTIALLY CONTINUOUSLY UPDATED DATA OVER A COMMUNICATIONS NETWORK

(71) Applicant: Chicago Mercantile Exchange Inc., Chicago, IL (US)

(72) Inventors: Pearce Ian Peck-Walden, Chicago, IL (US); Zachary Bonig, Skokie, IL (US); Craig Richard LeVeille, Winnetka, IL (US); Dileep Chakravarthi Konduru, Schaumburg, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 17/881,993

(22) Filed: Aug. 5, 2022

(65) Prior Publication Data

US 2023/0147315 A1    May 11, 2023

Related U.S. Application Data

(63) Continuation of application No. 15/717,073, filed on Sep. 27, 2017, now Pat. No. 11,443,250.

(60) Provisional application No. 62/424,647, filed on Nov. 21, 2016.

(51) Int. Cl.
    *G06Q 40/04*    (2012.01)
(52) U.S. Cl.
    CPC .................... *G06Q 40/04* (2013.01)

(58) Field of Classification Search
    None
    See application file for complete search history.

(56) References Cited

U.S. PATENT DOCUMENTS

| | | |
|---|---|---|
| 5,761,442 A | 6/1998 | Barr |
| 6,633,835 B1 | 10/2003 | Moran et al. |
| 6,898,692 B1 | 5/2005 | Cameron et al. |
| 7,197,483 B2 | 3/2007 | Brady |
| 7,299,277 B1 | 11/2007 | Moran et al. |
| 7,434,096 B2 | 10/2008 | Callaway |
| 7,584,141 B1 | 9/2009 | Andrews |
| 7,899,749 B1 | 3/2011 | Studnitzer et al. |
| 7,930,234 B2 | 4/2011 | Grubb |

(Continued)

OTHER PUBLICATIONS

Lu, Ning A, Machine Learning Approach to Automated Trading, Boston College Computer Science Senior Thesis, May 2016 (Year: 2016).*

(Continued)

*Primary Examiner* — Daniel S Felten
*Assistant Examiner* — Claire A Rutiser
(74) *Attorney, Agent, or Firm* — LEMPIA SUMMERFIELD KATZ LLC

(57) ABSTRACT

The disclosed embodiments relate to the electronic communication of messages via a communications network reflective of substantially continuously updated data in an electronic transaction processing system. The disclosed embodiments conserver electronic communications resources, e.g. bandwidth, while preserving real time delivery of critical data via selective or conditional publication and transmission of messages.

29 Claims, 4 Drawing Sheets

(56) References Cited

U.S. PATENT DOCUMENTS

| | | | |
|---|---|---|---|
| 8,660,936 B1* | 2/2014 | Banke | G06Q 40/04 |
| | | | 340/568.1 |
| 8,745,147 B2 | 6/2014 | Bryan | |
| 8,762,249 B2 | 6/2014 | Taylor | |
| 9,639,895 B2 | 5/2017 | Callaway et al. | |
| 2002/0019812 A1 | 2/2002 | Board | |
| 2003/0014462 A1 | 1/2003 | Bennett et al. | |
| 2003/0086515 A1 | 5/2003 | Trans et al. | |
| 2003/0177126 A1* | 9/2003 | Weingard | G06Q 40/04 |
| 2004/0030632 A1* | 2/2004 | Hausman | G06Q 10/087 |
| | | | 705/37 |
| 2005/0050293 A1 | 3/2005 | Falk et al. | |
| 2005/0096999 A1 | 5/2005 | Newell et al. | |
| 2005/0131790 A1 | 6/2005 | Benzschawel | |
| 2005/0154627 A1 | 7/2005 | Zuzek | |
| 2005/0197916 A1 | 9/2005 | Newell | |
| 2005/0203826 A1 | 9/2005 | Farrell et al. | |
| 2005/0273408 A1* | 12/2005 | Bandman | G06Q 20/027 |
| | | | 705/35 |
| 2006/0047590 A1* | 3/2006 | Anderson | G06Q 40/06 |
| | | | 705/35 |
| 2006/0268871 A1 | 11/2006 | Van Zijst | |
| 2007/0025351 A1 | 2/2007 | Cohen | |
| 2007/0027796 A1 | 2/2007 | Claus et al. | |
| 2007/0038543 A1* | 2/2007 | Weinstein | G06Q 20/027 |
| | | | 705/36 R |
| 2007/0198465 A1 | 8/2007 | Meacham et al. | |
| 2007/0276748 A1* | 11/2007 | Shapiro | G06Q 40/03 |
| | | | 705/37 |
| 2008/0097887 A1* | 4/2008 | Duquette | G06Q 30/06 |
| | | | 705/37 |
| 2008/0275806 A1* | 11/2008 | Raitsev | G06Q 10/087 |
| | | | 705/37 |
| 2009/0019305 A1 | 1/2009 | Genetski | |
| 2009/0059941 A1 | 3/2009 | Callaway | |
| 2009/0063360 A1* | 3/2009 | Callaway | H04L 43/0894 |
| | | | 705/36 R |
| 2009/0089071 A1 | 4/2009 | Doornebos | |
| 2009/0089200 A1* | 4/2009 | Stephen | H04L 43/0894 |
| | | | 705/36 R |
| 2009/0187511 A1 | 7/2009 | Doornebos | |
| 2009/0228399 A1 | 9/2009 | Connors | |
| 2009/0265264 A1 | 10/2009 | Bosse | |
| 2009/0299914 A1 | 12/2009 | Moran et al. | |
| 2010/0174633 A1* | 7/2010 | Milne | G06Q 40/06 |
| | | | 705/37 |
| 2010/0179930 A1 | 7/2010 | Teller | |
| 2010/0268633 A1* | 10/2010 | Rosenthal | G06Q 40/08 |
| | | | 705/37 |
| 2011/0264581 A1 | 10/2011 | Clyne | |
| 2011/0320383 A1* | 12/2011 | Chang | G06Q 40/06 |
| | | | 705/37 |
| 2012/0011080 A1* | 1/2012 | Smith | G06Q 40/06 |
| | | | 705/36 R |
| 2012/0054134 A1 | 3/2012 | West | |
| 2012/0089497 A1* | 4/2012 | Taylor | G06Q 40/04 |
| | | | 705/35 |
| 2013/0179219 A1 | 7/2013 | Ross | |
| 2013/0282549 A1 | 10/2013 | Howorka | |
| 2014/0019221 A1 | 1/2014 | Robinson | |
| 2014/0040062 A1 | 2/2014 | Studnitzer | |
| 2014/0114720 A1* | 4/2014 | Thind | G06Q 40/04 |
| | | | 705/7.28 |
| 2014/0172751 A1 | 6/2014 | Greenwood | |
| 2014/0201126 A1 | 7/2014 | Zadeh | |
| 2014/0289165 A1* | 9/2014 | Dinesh Chheda | G06Q 40/04 |
| | | | 705/36 R |
| 2014/0310149 A1* | 10/2014 | Singh | G06Q 40/04 |
| | | | 705/37 |
| 2014/0324752 A1 | 10/2014 | Statnikov | |
| 2014/0359638 A1* | 12/2014 | de Lima | G06F 9/546 |
| | | | 719/313 |
| 2015/0081492 A1 | 3/2015 | Brereton | |
| 2015/0088723 A1 | 3/2015 | Acuna-rohter | |
| 2015/0088726 A1 | 3/2015 | Aisen | |
| 2015/0127515 A1 | 5/2015 | Studnitzer | |
| 2015/0161727 A1* | 6/2015 | Callaway | G06Q 40/04 |
| | | | 705/37 |
| 2015/0178831 A1* | 6/2015 | Bonig | H04L 47/6225 |
| | | | 705/37 |
| 2015/0278839 A1* | 10/2015 | Hansen | G06Q 10/087 |
| | | | 705/7.35 |
| 2016/0173360 A1 | 6/2016 | Goldin | |
| 2016/0182414 A1* | 6/2016 | Mestanogullari | H04L 67/04 |
| | | | 709/206 |
| 2016/0275427 A1 | 9/2016 | Buehrer | |
| 2017/0091673 A1 | 3/2017 | Gupta | |
| 2017/0178234 A1 | 6/2017 | Jezek, Jr. | |
| 2018/0315119 A1* | 11/2018 | West | G06Q 40/06 |
| | | | 705/37 |
| 2019/0266671 A1 | 8/2019 | Studnitzer | |
| 2019/0312119 A1 | 10/2019 | Cho et al. | |
| 2020/0090278 A1* | 3/2020 | Christensen | H04L 43/0894 |
| | | | 705/36 R |

OTHER PUBLICATIONS

Lu, Ning A Machine Learning Approach to Automated Trading, Boston College Computer Science Senior Thesis, May 9, 2016 Year: 2016).

Wesen, J. E., Vermehren, V., & de Oliveira, H. M. (2015). Adaptive filter design for stock market prediction using acorrelation-based criterion. arXiv preprint arXiv:1501.07504. (Year: 2015).

* cited by examiner

CONSERVATION OF ELECTRONIC COMMUNICATIONS RESOURCES VIA SELECTIVE PUBLICATION OF SUBSTANTIALLY CONTINUOUSLY UPDATED DATA OVER A COMMUNICATIONS NETWORK

RELATED APPLICATIONS

This application is a continuation under 37 C.F.R. 1.53(b) of U.S. patent application Ser. No. 15/717,073, filed Sep. 27, 2017, which claims the benefit of the filing date under 35 U.S.C. § 119(e) of Provisional U.S. Patent Application Ser. No. 62/424,647, filed on Nov. 21, 2016, which are hereby incorporated by reference in their entirety.

BACKGROUND

Electronic transaction processing systems generally receive requests to transact from users via a communications network and process those requests against other such received requests in order to facilitate transactions among users. Such systems may use data generators to publish and transmit electronic messages via the communications network to those who submit requests system, these messages being reflective of the status of the processing of the received requests. In systems which receive a high volume of transaction requests, and thereby process a high volume of transactions, the processing of a given transaction request may result in a significant number of transactions being processed and correspondingly result in generation and transmission of a significant number of messages reflective thereof.

An example of an electronic transaction processing system is a financial instrument trading system, such as a futures exchange, referred to herein also as an "Exchange", such as the Chicago Mercantile Exchange Inc. (CME), which provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting, and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network, referred to as an "electronic trading system." These "electronic" marketplaces are an alternative to pit based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

One manner in which electronic marketplaces attempt to achieve these goals is by equitably providing access to public market information, such as by efficiently disseminating public data, e.g. market data, prices, etc. or changes thereto, to all market participants, via market data feeds, i.e. the electronic communication of messages reflecting the status of transaction requests and transactions resulting therefrom. However, as more traders place more trades, the volume of data being communicated increases as well, increasing the burden on the communication infrastructure and supporting resources that are used to generate and transmit the communications in this manner.

DETAILED DESCRIPTION

Figure 1:
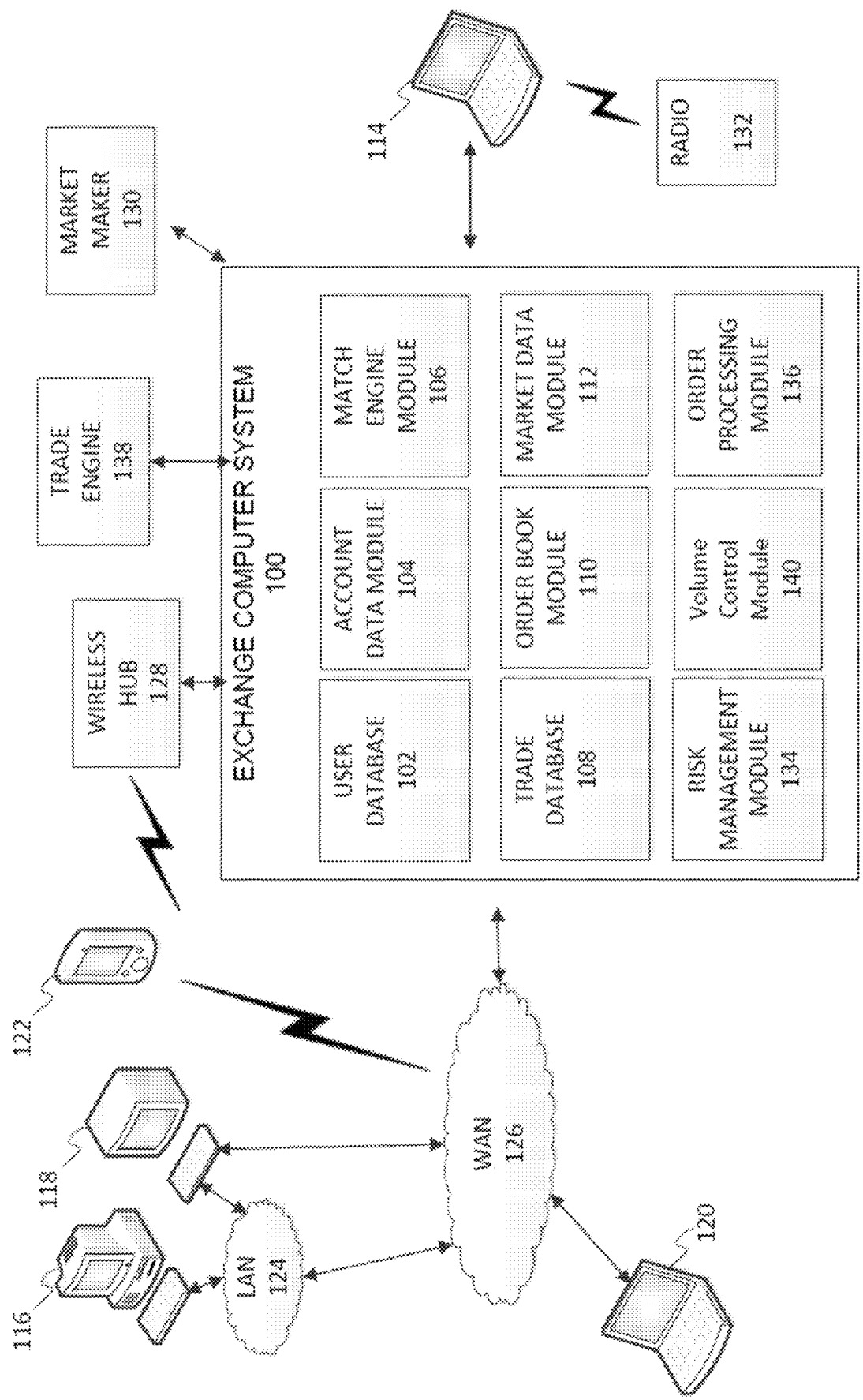
FIG. 1 depicts an illustrative computer network system that may be used to implement aspects of the disclosed embodiments.

The disclosed embodiments relate to the electronic communication of messages via a communications network reflective of substantially continuously updated data in an electronic transaction processing system. The disclosed embodiments conserve electronic communications resources, e.g. bandwidth, while preserving real time delivery of critical data via selective and/or conditional publication and transmission of messages.

In particular, the disclosed embodiments relate to selective/conditional communication of financial messages from an Exchange, such as the Chicago Mercantile Exchange ("CME"), to market participants whereby messages, or at least a portion of the content thereof, indicative of changes in the market, due to one or more trades between two or more market participants, are selectively aggregated or otherwise buffered and then conditionally communicated via the network as will be described, i.e. under some conditions the messages may not be communicated.

It will be appreciated that the messages described herein may be generated in real time as events, e.g. transaction requests are received and/or transactions are processed, occur or substantially proximate thereto, such that a given message may be correlated to one or more events, the generation of these messages being referred to as "substantially continuous" or otherwise occurring in real time.

While the disclosed embodiments may be discussed in relation to futures and/or options on futures trading, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner. In addition, it will be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participant are met, e.g. that predictable system responses are maintained.

Underpinning the provisioning of these features is a need to improve transaction processing performance while also improving the volume of transactions which can be processed by the electronic trading system. Electronic trading systems, as will be described, are implemented using computer technology, e.g. processors, memories, electronic communications networks, and the like. As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be interwired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory To improve performance and volume, merely implementing existing systems using newer and faster general purpose technology may be insufficient. General purpose processors, operating systems and compilers implement general optimizations and operations designed to improve performance and reliability while maintaining broad applicability across a wide variety of applications. As such, these optimizations are not necessarily optimized for any one application, e.g. such as for implementing a match engine of an electronic trading system. These optimizations, which are largely defined by the manufacturer and may be out of the control of an application developer, may include interrupt handling algorithms, algorithms to improve multitasking, memory management algorithms, pre-fetching, branch prediction, program code optimizations, etc. However, such optimizations may, in fact, undermine the application for which the general purpose processor is being used. In particular, with respect to the business transactions processed by an electronic trading system, where transactional determinism is paramount, underlying optimizations may be disruptive thereof.

As described above, as used herein a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real time processing.

For example, wherein the business rules define a first-in-first-out ("FIFO") process for matching offers with counter-offers to effect an exchange or trade, when an offer transaction is received to which no prior counter offer transaction has been previously received, it should be matched with the next suitable counter offer transaction received rather than a later received counter offer transactions. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g. market, or changes thereto, in which the business transactions are transacted should present an accurate reflection of the actual state or state change in accordance with the defined business rules, so as to not mislead participants or provide an unfair advantage. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith.

Generally, when the rate of business transaction processing is less than the underlying instructions processing capacity of the underlying general purpose processor, general performance optimizations implemented by the processor or operating system may be hidden or otherwise imperceptible at the transactional level. That is, the processor is able to perform these optimizations (e.g. page switches, instruction pre fetch, branch mis-predictions, cache miss processing, error/packet recovery) fast enough so as not to affect the executing business application. However, as the rate and volume of transactions increases, contention for internal processor resources, such as memory bandwidth, also increases. Accordingly, the impact of internal optimizations on the executing application may no longer be imperceptible. In a multiprocessor environment, this impact may affect the ability to maintain application tasks/processes, which are divided among multiple processors, in sync which each other which may result in out of order execution of one or more transactions.

General purpose processors and operating systems further suffer from their general availability and applicability which has made them susceptible to being reverse engineered and compromised by unknown or uncorrected deficiencies or defects, particularly security related, making them vulnerable to hacking, viruses and other threats. Accordingly, firewalls or other security appliances, applications or protocols may be required to ensure the safety and security of such systems which further adds latency, degrades throughput or otherwise impedes performance.

Alternatively, as will be described, the embodiments described below may be implemented using FPGA's or other reconfigurable logic. Implementing processing tasks and algorithms using an FPGA can yield significant performance enhancements over implementations using traditional microprocessors and operating systems. In particular, an FPGA based system implementation may avoid the processing overhead and uncontrollable/unnecessary optimizations implemented by general purpose processors, compilers, operating systems and communications protocols, as well as the security vulnerabilities thereof. For example, an FPGA may avoid interrupt handling, error correction, pre-fetching and other unnecessary microprocessor operations/optimizations, as well as generic processing/housekeeping tasks of the operating system which are not needed, such as garbage collection, unnecessary memory swaps, cache loads, task switching, cycle stealing, etc. Further an FPGA implementation may avoid the use of general purpose compilers which may introduce, for example, undesired program code optimizations.

For example, using an FPGA based implementation may permit components of a trading system to be collocated, such as via a custom interface, or otherwise closely interconnected with networking equipment, such as a router or switch, e.g. via a backplane thereof. This would allow the trading system to have access to incoming transactions as quickly as possible and avoid the latency introduced, not only by having to route the transaction over conventional networking media, but also by the communications protocols, e.g. Transport Control Protocol ("TCP"), used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable trading platform under the supervision of a host CPU. Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

However, merely increasing operating performance, whether via an improved general purpose processor or via an FPGA based implementation, may expose, or reduce tolerance of, fundamental flaws of traditional computer hardware, operating systems or the algorithms/programs implemented thereon, as well as network interconnects/communications media. Such flaws, which may result in non-deterministic operation, include manufacturing imperfections/variabilities (clock skew, long paths, Resistance/Capacitance ("RC") delay, alpha particles, etc.), susceptibility to environmental conditions or changes thereto (temperature, humidity, solar flares, etc.), and human error (intermittent or loose connections, improper configuration, etc.). These flaws may introduce transient errors, such as race conditions, bit errors or packet loss, which affect deterministic operation. These issue may be compounded in a multiprocessor (whether distributed or co-located, e.g. in the same room, the same box, the same package, or on the same substrate) environment, which is desirable for fault tolerance and/or improved performance, where new interconnects and imperfections/variabilities are introduced/multiplied, interconnects are longer (increasing the occurrence of race conditions and/or jitter, i.e. variability over time of communications latency), coherence issues are introduced necessitating complex coherency management mechanisms (thread or resource locking, etc.), and resource (data, memory, bus) contention or conflicts may occur.

Furthermore, mere improvements to performance can reveal problems with the applications themselves, such as trading applications or their underlying algorithms. For example, an increase in the rate of transaction processing may cause variances/divergence, between actual operation and ideal or expected operation, to emerge, be amplified, exacerbated (possibly exploited) or compounded beyond an acceptable level, e.g. before the application can be reset or other corrective action taken. In particular, deficiencies with assumptions, e.g. factors thought to be negligible or at least acceptable, may become significant, such as the assumed requisite degree of precision or rounding, assumed number decimal places, assumed number of bits (which may cause overflow), assumed or limited precision constants or variables (e.g. a time variable incapable of nanosecond or other requisite precision), factors assumed to be constant which are in fact variable, variables ignored for convenience or to reduce complexity, tradeoffs and compromises (made for convenience/to reduce cost/complexity or improve performance of the implementation). Further, the occurrence of unaccounted for, or intentionally ignored, assumed-statistically-insignificant events/factors, variables, rounding errors, corner cases, rare or unexpected/unanticipated states or state transitions may present an increasing risk. Generally, speed becomes a lens which creates, or magnifies/reveals underlying, defects and/or divergences, e.g. where a later transaction may overtake an earlier transaction (race condition), as well as limits recovery time from, or otherwise reduces tolerance for, errors (transient or systemic (delay) such as bit errors, packet loss, etc.). Such flaws may cause inconsistencies and/or may be unfairly exploited.

Accordingly, beyond mere performance improvements, improved architectures and algorithms for implementing electronic trading systems may be needed to ensure proper, e.g. transactionally deterministic, operation by avoiding optimizations and operations which may undermine intended operation and avoid, account and/or compensate for performance related/introduced/revealed inadequacies.

The disclosed architecture, and implementations thereof, described in detail below, facilitate improved, e.g. low latency and high volume, transactional performance and fault tolerance with assured transactional determinism, while further enabling additional value added functionality to improve information outflow, trading opportunities, e.g. the ease with which trades can occur or liquidity, risk mitigation and market protections, as will be described below.

In the exemplary embodiments, all transactions are ultimately received at the electronic trading system via a single point of entry, i.e. a single communications interface, at which the disclosed embodiments apply determinism, which as described is moved away from the point where matching occurs and closer to the point where the electronic trading system first becomes "aware" of the incoming transaction. This may require improving the performance of this communications interface to process the influx of transactions without being overwhelmed. In some implementations, more orders may be submitted by market participants via more parallel inputs/channels/communications pathways implemented to increase capacity and/or reduce resource contention. However, for many of the reasons described above, parallel communication paths complicate deterministic behavior, e.g. by creating opportunity, such a via asymmetric delays among communications paths, for later transmitted or arriving transactions to overtake earlier arriving or transmitted transactions, and may require mechanisms to discriminate among closely received transactions and arbitrate among simultaneously, or substantially simultaneously, received transactions, e.g. transactions received at the same time or received within a threshold of time unresolvable by the system. Accordingly, mechanisms may be implemented to improve and impart deterministic handling of discrimination and arbitration among closely received transactions.

As was described above, to gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, as described, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

In addition to efficiency, fairness and equity, electronic trading systems further provide significant performance improvements allowing for rapid high volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed. Throughput may be measured as the maximum number of orders or trades per second that the electronic trading system can support, i.e. receive and acknowledge, receive and match, etc.

Generally, market participants desire rapid market data updates, low latency/high throughput order processing, and prompt confirmations of their instructions to allow them to: competitively, frequently and confidently evaluate, react to, and capitalize upon or, conversely, avoid, discrete, finite, fast moving/changing or ephemeral market events; leverage low return transactions via a high volume thereof; and/or otherwise coordinate, or synchronize their trading activities with other related concerns or activities, with less uncertainty with respect to their order status. Higher volume capacity and transaction processing performance provides these benefits as well as, without detrimentally affecting that capacity or performance, further improves market access and market liquidity, such as by allowing for participation by more market participants, the provision of additional financial products, and/or additional markets therefore, to meet the varying needs of the market participants, and rapid identification of additional explicit and implicit intra- and inter-market trading opportunities. The Exchange benefits, for example, from the increased transaction volume from which revenue is derived, e.g. via transaction fees.

Current electronic trading systems already offer significant performance advantages. However, increasing transaction volumes from an increasing number of market participants, implementation by some market participants of algorithmic and/or high frequency trading methodologies whereby high speed computers automatically monitor markets and react, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access. For example, the increasing speed at which market participants may evaluate and respond to changes in market data, such as responsive to a market event, is increasing the rate at which transactions are received by the electronic trading system, narrowing the time of receipt gap there between and necessitating a need for a higher degree of discrimination so as to resolve the order in which those transactions are received, upon which the deterministic operation of the electronic trading system may be based, e.g. for order allocation, etc. Furthermore, the addition, by electronic trading systems, of additional channels of communication in an effort to increase capacity and opportunity, along with increased bandwidth of each channel, allows for more transactions to be submitted over multiple parallel paths into the system. Accordingly, not only must the electronic trading system discriminate among closely received incoming transactions, but must further arbitrate among transactions received simultaneously, or temporally so close together as to be considered simultaneously received, i.e. the difference in their time of receipt being too close to measure by the implemented discrimination mechanisms, also referred to as "substantially simultaneously".

In addition to increased capacity and lower latency, the global nature of business has further driven a need for fault tolerance to increase availability and reliability of electronic trading systems. Scheduled outages must be minimized and unscheduled outages must be eliminated.

Furthermore, to implement the Exchange's clearing function, which mitigates the concerns of market participants relating to performance by counter parties, protects the interests of the Exchange and otherwise adequately manages/mitigates risk, risk management systems having corresponding operational efficiency and performance are needed so as to protect the Exchange from loss while minimizing impediments to market operations or distractions to market participants with ancillary and unnecessary tasks. In addition, increased transaction volume may further translate into greater exposure for market participants requiring greater amounts of capital to be posted to cover losses. Accordingly, more accurate and/or tailored risk assessment may be required to ensure that only the necessary minimum amount of capital is required to be allocated by the market participants to cover potential losses and avoid undue encumbrances on/impediments to the ability of those market participants to conduct their business.

Improved speed and efficiency also, unfortunately, improves the speed at which problems may occur and propagate, or otherwise be exploited, such as where the market ceases to operate as intended, i.e. the market no longer reflects a true consensus of the value of traded products among the market participants. Market protection systems may therefore be needed to monitor and evaluate trading activity, detect illegitimate/exploitive activity and appropriately react more quickly to mitigate the spread of problems, again without impeding legitimate market operation.

A market data feed, referred to as market data or market feed, is a compressed or uncompressed real time (with respect to market events as described herein), or substantial approximation thereof, data/message stream, i.e. sequentially generated, provided by the Exchange directly, or via a third-party intermediary. A market data feed may be comprised of a sequence of individual messages, each comprising one or more packets or datagrams, and may carry, for example, pricing or other information regarding orders placed, traded instruments and other market information, such as summary values and statistical values, or combinations thereof, and may be transmitted, e.g. multi-casted, to the market participants using standardized protocols, such as UDP over Ethernet. More than one market data feed, each, for example, carrying different information, may be provided. The standard protocol that is typically utilized for the transmission of market data feeds is the Financial Information Exchange (FIX) protocol Adapted for Streaming (FAST), aka FIX/FAST, which is used by multiple exchanges to distribute their market data. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order on the order book to rest;
(2) The matching engine creates an update reflecting the opportunity and sends it to a feed engine;
(3) The feed engine multicasts it to all of the market participants to advertise the opportunity to trade;
(4) The market participants evaluate the opportunity and each, upon completion of their evaluation, may or may not choose to respond with an order responsive to the resting order, i.e. counter to the resting order;
(5) The Exchange gateway receives any counter orders generated by the market participants, sends confirmation of receipt back directly to each submitting market participant, and forwards the received orders to the matching engine; and
(6) The matching engine evaluates the received orders and matches the first arriving order against the resting opportunity and a trade is executed.

As used herein, a financial message refers both to messages communicated by market participants to an electronic trading system and vice versa. Financial messages communicated to the electronic trading system, also referred to as "inbound" messages, may include request or order messages, such as trader orders, order modifications, order cancellations and the like, as well as other message types. Financial messages communicated from the electronic trading system, referred to as "outbound" messages, may include messages responsive to inbound messages, such as confirmation or acknowledgment messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example a request to place a trade may result in a response indicative of the trade either being matched with, or being rested on an order book to await, a suitable counter-order. This response may include a message directed solely to the trader who submitted to the order to acknowledge receipt of the order and report whether it was matched, and the extent thereof, or rested. The response may further include a message to all market participants reporting a change in the order book due to the order. This response may take the form of a report of the specific change to the order book, e.g. an order for quantity X at price Y was added to the book (referred to as a Market By Order message), or may simply report the result, e.g. price level Y is now has 5 orders for a total quantity if Z (where Z is the sum of the previous resting quantity plus quantity X of the new order) (referred to as a Market By Price message). In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. As market impacting communications tend to be more important to market participants then non impacting communications, this separation may reduce congestion and or noise among those communications having or reflecting an impact on a market or portion thereof. Furthermore, a particular market data feed may only communicate information related to the top buy/sell prices for a particular product, referred to as "top of book" feed, e.g. only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants. Generally, the disclosed embodiments relate to a restructuring of response messages reflecting market impacting events to reduce redundant data and convey more relevant information about the event to all market participants sooner than less relevant information so that the market participants may comprehend the event more quickly. Furthermore, the disclosed embodiments relate to consolidation of the communication of market impact reflecting response messages, e.g. responsive to inbound messages, with other market impact reflecting messages as will be described. In other implementations, these communications may or may not be further consolidated with non-market impacting messages.

Examples of the various types of market data feeds which may be provided by electronic trading systems, such as the CME, in order to provide different types or subsets of market information or to provide such information in different formats include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index).

Market data feeds may be characterized as providing a "view" or "overview" of a given market, an aggregation or a portion thereof or changes thereto. For example, a market data feed, referred to as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g. only the top 10 resting buy/sell orders and, thereby, only provide a view of that portion. As used herein, a market impacting request may be said to impact the "view" of the market as presented via the market data feed. An MBP feed may utilize different message formats for conveying different types of market impacting events. For example, when a new order is rested on the order book, an MBP message may reflect the current state of the price level to which the order was added, e.g. the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e. report the result of multiple market impacting events in a single message.

Alternatively, a market data feed, referred to as a Market by Order ("MBO") feed, may convey data reflecting a change that occurred to the order book rather than the result of that change, e.g. that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g. as it is modified, canceled, traded, etc.

It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated response to market impacting events which are caused by more than one order, such as a trade, may require the transmission of a significant amount of data to convey the requisite information to the market participants. For trades involving a large number of orders, e.g. a buy order for a quantity of 5000 which matches 5000 sell orders each for a quantity of 1, a significant amount of information may need to be sent, e.g. data indicative of each of the 5000 trades that have participated in the market impacting event. It will be appreciated that the disclosed embodiments are applicable either to a MBP market data feed or an MBO market data feed.

The disclosed embodiments relate to filtering, e.g. selectively and conditionally aggregating and transmitting, market data to market participants. This allows for granularly and intelligently controlling the market data that is published and thereby optimizing overall bandwidth utilization of the network connections over which market data is transmitted as well as optimizing the data transmission rate, all without delaying immediate transmission of critical data as with using snapshots (see U.S. Pat. No. 7,899,749, herein incorporated by reference).

As was noted above, a given change in the state of an electronic marketplace can result in the generation of a significant amount of market data for communication to market participants. Where the volume of such data is low, there is little to no penalty in simply transmitting all of the data as it is generated, i.e. in real time. However, when the volume of data is significant, the available network communications bandwidth may be quickly consumed resulting in degradation of performance, i.e. delayed delivery, lost data, etc.

In order to limit bandwidth use, some systems distribute market data periodically. Market data is compiled and sent at designated transmission times, such as every second. For example, if there are initially ten resting orders at a given price and fifteen additional orders are received before the next transmission time, at the next transmission time a single market data message is transmitted to show that there are twenty-five resting orders at the given price. Periodic market data messages may not reflect current market prices. If the market changes between market data transmissions, participants are not presented with current information. Without current and accurate price information, participants cannot make optimal decisions.

Some systems adjust the type of market data that is transmitted based on a difference between an inbound data rate and possible, feasible or achievable outbound data rates. The transmission of the market data is agnostic of the effect publishing the market data has on the future state of the market. The transmission of the market data is filtered based on an amount of bandwidth, not on the importance of the market data. The transmission is "dumb" in the context that the conditions do not distinguish between marketplace data that is important or not important.

Some systems use predetermined conditions to limit bandwidth. For example, when the market data does not result in a change in a market price, the market data may not be published. Instead, the market data may be aggregated with market data for similar events. For example, if the market data indicates that there is an order for five contracts at a given price, the quantity of five is aggregated with the pending order quantity that exist for the same contract at the same price. Finally, when the aggregated market data passes a quantity threshold, the aggregated market data is distributed. Predetermined conditions may provide some guidance in limiting bandwidth use, but fail to take into account whether or not the published data is useful to a participant. As such, the conditions are "dumb" in the context that the conditions do not distinguish between marketplace data that is important or not important.

Both periodic and predetermined publishing schemes also may not limit the amount of marketplace data that is published, but rather only spread out the data over a longer time period. As both schemes do not distinguish important data, all marketplace data may be eventually published including marketplace data that is not relevant to participants under certain conditions. Periodic and predetermined schemes may solve some burst problems, but cannot handle significant sustained increases in market data.

In particular, with the implementation of triangulation, which links futures contracts with associated options contracts, the amount of market data that is generated will significantly increase. Triangulation may relate to the interaction between futures, premium option, and volatility order books allowing incoming orders to trade across all three books. Triangulation allows for orders to quickly and efficiently imply between the books increasing market liquidity. Triangulation allows traders to place orders to trade options contracts by specifying those orders based on volatility or on price. The orders are trading against separate order books with separate match engines, for example a volatility order book and a premium option book. Implication may be used between the volatility book and premium book to provide liquidity. Hedging, via implication, into an underlying futures order book may also be provided to automatically trade the requisite futures contracts to hedge a particular options trade. While Triangulation may provide additional trading opportunities and liquidity, a drawback may be massive communication bursts that degrade performance on the exchange and customer sides.

In an example, a single underlying futures contract may imply into hundreds or thousands of options strikes. Thus, one futures price change may lead to hundreds or thousands of related changes in options prices. Preliminary models show that when triangulation is implemented, the amount of market data may increase by a magnitude of 1,000, creating a situation where the market data will be too resource intensive to compute, transmit, and consume.

The disclosed embodiments generally relate to selective aggregation and publication/transmission of market data, whereby one or more dynamic triggers/conditions control when different market data is published. The dynamic triggers help achieve a balance between providing timely updates when important/critical events occur and optimizing the amount of market data published given the available bandwidth. The dynamic triggers/conditions are generated using historical marketplace data and predictive models. Triggers/conditions may be separated into two different types, static and dynamic. Static triggers rely on hard and fast rules for when market data may be transmitted. Static triggers may include conditions such as identifying when there is a change in market price, when a number of implied order quantities has been reached, or when a transmission bandwidth availability is met. Each of these triggers or conditions may be satisfied in a vacuum without identifying the current state of the market. Dynamic conditions may be triggered based on a detected change in the electronic marketplace and the current state of the electronic marketplace. Examples of dynamic conditions include: monitoring current conditions such as volatility, volume, throughput, or economic events and publish dynamically based on the conditions and historical data; determining a probability of a price being acted upon, based upon historical analysis (e.g., if the probability is high that publishing a price will cause a market execution, publish immediately); quality or "score" of an order or message based upon historical analysis; trend or direction of market; among others. A dynamic condition takes into account the environment in which the change in the state of the market is occurring and thus may be dynamic (or different) based on external factors.

The dynamic conditions may provide for different transmission plans for the same change in the state of the electronic marketplace depending on other factors such as market factors, environmental factors, and historical marketplace data. An order that results in a one tick change in an electronic marketplace may satisfy a first dynamic condition if, for example, the volatility index, event time, and order rate predict that publishing the change in the marketplace will result in an action by one or more marketplace participants. A similar order received a week later that results in the same change may not satisfy a second dynamic condition that has evolved from the first dynamic condition due to intervening marketplace data collected by the exchange or different external or market factors.

Dynamic conditions may be generated by modeling historical marketplace data in order to predict a future state of the marketplace. Dynamic conditions may be generated using machine learning techniques. Networks may be trained using historical marketplace data to identify future actions or future marketplace states. Feedback mechanisms may be used to retrain the networks as additional marketplace data is acquired. For example, each published change may be tracked and stored in order to improve the ability of the system to predict when a received transaction (and change in the state of the market) should be published.

The disclosed embodiment may further allow for customized market data feeds in addition to the selective aggregation and conditional transmission of market data described above. In particular, customized market data feeds may be provided allowing market participants to specify a customized field order and/or additional custom data fields to be included in their market data feed. As was described above, electronic trading systems broadcast market data feeds to the market participants to notify them of changes in the state of the market, such as price updates, trade notifications, etc. The feeds comprise a stream of individual event messages which are multi-casted to the market participants in a predefined format, e.g. FIX/FAST, such that all market participants receive the same information. Upon receipt, many market participants, including feed aggregators which aggregate data feeds from other exchanges and which further may modify and/or relay the data feed to others, typically further process the market data from the feed, such as by using a Ticker Plant, to tailor the data, e.g. the content and/or format, to their particular needs, and then rebroadcast the modified data, such as to their individual trader/trader terminals.

The tailoring may further include extracting one or more subsets of data from each data feed message considered to be more important than the remaining data, reordering the data in a format further suitable for subsequent processing, e.g. so that more critical data is processed first, and deriving, extracting or otherwise computing values or metrics based on the data. It will be appreciated that such tailoring of the market data feed may occur elsewhere, such as at a trader terminal. Examples of derived values include "Greeks" which is a set of different measures/dimensions/variables of risk involved in taking a position in an option (or other derivative). Each Greek, or particular measure of risk, is a result of an imperfect assumption or relationship of the option with another underlying variable. Various sophisticated hedging strategies are used to neutralize or decrease the effects of one or more of these measures of risk. Not all of these risk measures are important to all market participants and some are more important than others. With the exception of Vega (which is not a Greek letter), each measure of risk is represented by a different letter of the Greek alphabet. Greeks include

- Δ (Delta) represents the rate of change between the option's price and the underlying asset's price—in other words, price sensitivity;
- Θ (Theta) represents the rate of change between an option portfolio and time, or time sensitivity;
- Γ (Gamma) represents the rate of change between an option portfolio's delta and the underlying asset's price—in other words, second-order time price sensitivity;
- Y (Vega) represents the rate of change between an option portfolio's value and the underlying asset's volatility—in other words, sensitivity to volatility; and
- ρ (Rho) represents the rate of change between an option portfolio's value and the interest rate, or sensitivity to the interest rate.

It will be appreciated that there may be other derived or computed values, now available or later developed, of interest to market participants which may be provided by the electronic trading system in a customized market data as described. For example, such other derived or computed values may include:

- non-public data—e.g. such as order identifiers or hidden quantities privy only to a specific trader;
- Position data—data showing a trader's risk exposure (similar to delta, but tied to actual orders) due to a shift in the market; or
- Requests For Quote(s)—certain requests for quotes may not be fully public, and need to be filtered only to the traders allowed to respond to the RFQ.

The disclosed embodiments recognize such processing, wherever it may take place outside of the electronic trading system, of the market data feed upon receipt imparts delay in ultimately providing that data, or the information derived therefrom, to the recipients who are waiting for it. Furthermore, Ticker Plants and trading software interfaces, which are typically comprised of custom software, are costly and not all market data recipients can afford to implement them or afford efficient implementations which minimize delay or provide all of the necessary functionality.

Accordingly, the disclosed embodiments offer a "value added" market data feed by providing the capability for a market participant to customize the market data feed to their needs by specifying the order of the data within each feed message and/or specifying desired computed or derived values to be included in, or otherwise coalesced with, the feed message. Other market participants would continue to receive the standard market data feed. In one embodiment, customized market data feeds may be provided as a service, such as a subscription service, whereby a market participant pays the operator of the electronic trading system a fee, such as a one-time or periodic, e.g. monthly, annual, etc., for the service. This fee, which may vary depending upon the amount of customization or other factors, may be in addition to, or included within, a fee paid for the standard market data feed. For example, the operator of the electronic trading system may provide a web site to which market participants log in via an account associated therewith. The web site may present the various options for customizing the market data feed and the cost associated therewith and allow the market participant to choose the desired customizations. A sample of the customized market data message may then be provided, based on a real or synthetic market data message to allow the market participant to confirm their desired customizations. Further, the web site may permit the market participant to provide a payment medium, such as a credit card, etc., or authorization to cover the costs. In one embodiment, the market data feed customizations may be limited to a set of defined customizations, or templates, from which the market participant may select. Alternatively, the market participant may be permitted to customize all aspects of the market data feed. It will be appreciated that the number, type and degree of permitted customization, from predefined templates to fully customized specifications, is implementation dependent and all are contemplated herein.

As will be described below, the customization of market data feeds may be implemented close, logically and/or physically, to the point at which market data feed messages egress the electronic trading system en-route to their ultimate destination to ensure that the time of dispatch of all of the market data messages, i.e. both the customized and the standard messages, is normalized so as to avoid providing any advantage to a market participant in receiving their messages prior to other market participants. Further, the disclosed customization may further be implemented close, logically and/or physically, to the match engines of the electronic trading system so as to have expedient access to market event data for the computation and/or derivation of data or metrics therefrom. In one embodiment, a market data customization component is implemented on the same FPGA as the Decider component described above. Alternatively, the market data customization component may be separately implemented, such as on a separate FPGA. It will be appreciated that the disclosed market data customization may be implemented with the Order/Decider match engine architecture described herein or with the current match engine architecture. More information regarding market data feed customization may be found in U.S. Patent Application Publication No. 2015/0127512 A1, the entire disclosure of which is incorporated by reference herein.

By providing customized market data feeds, the need by the market participants to further process the market data messages upon receipt is eliminated thereby avoiding the need to implement costly and complex software to process the data and the processing delay incurred thereby. Furthermore, as the disclosed embodiments substantially simultaneously, i.e. with little to no discernable time difference there between, transmit both the standard market data feed and the customized market data feeds, market participants desiring customized data feeds need no longer incur the disadvantage of the delay imparted by processing the received data compared with market participants who do not process the market data feed. Accordingly, more equitable access to customized data feeds is provided without loss of parity among the market participants.

In accordance with aspects of the disclosure, systems and methods are disclosed for generating financial messages in accordance therewith. The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
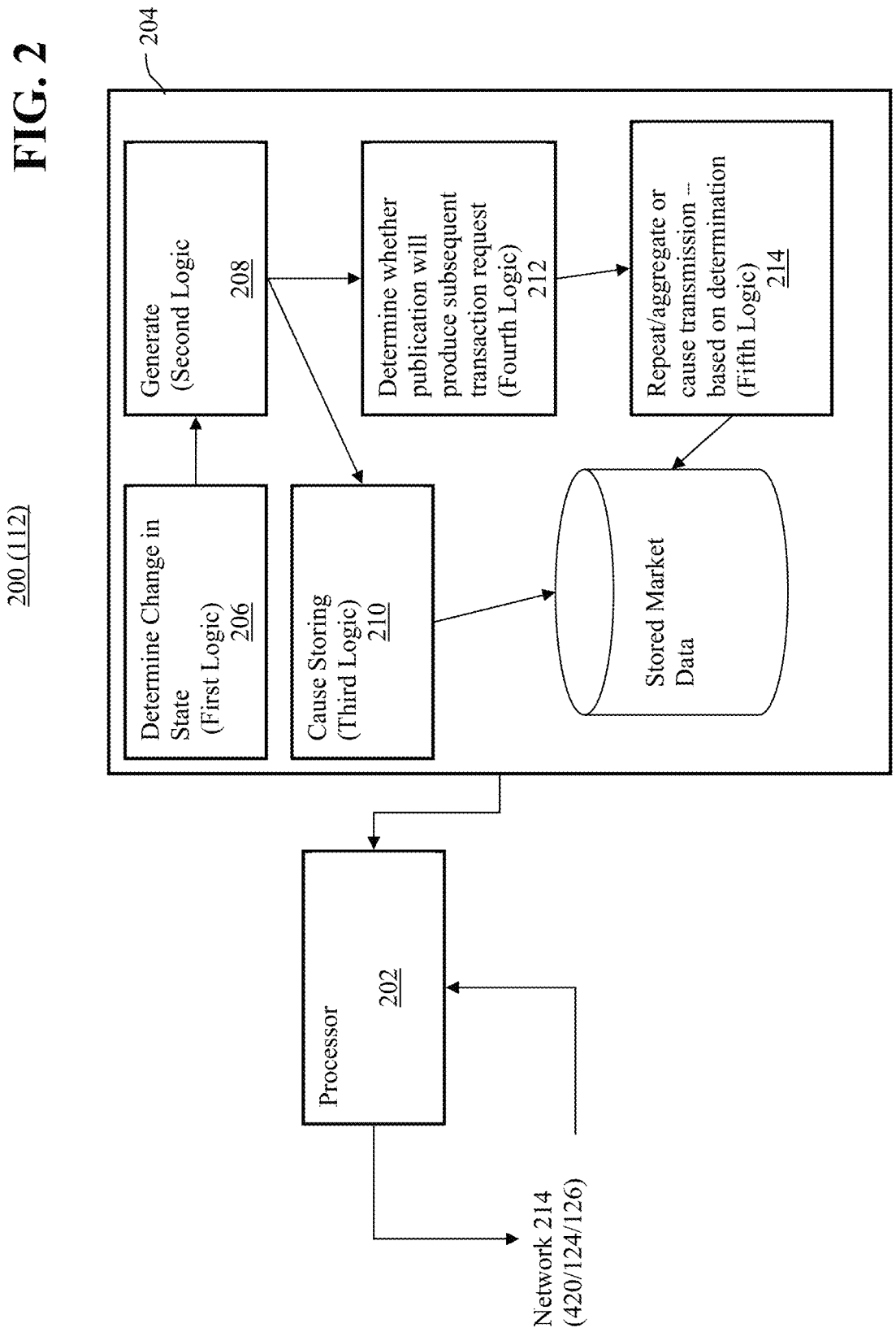
FIG. 2 a block diagram of an exemplary implementation of the system of FIG. 1 for managing communications of financial messages.

As shown in FIG. 1, the Exchange computer system 100 includes a market data module 112 which may implement the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 2 depicts a block diagram of a market data module 112 according to one embodiment, which in an exemplary implementation, is implemented as part of the exchange computer system 100 described above. As used herein, an exchange 100 includes a place or system that receives and/or executes orders. In particular, FIG. 2 shows a system 200 for efficient management of reporting or otherwise communication, such as via a network 214, to a plurality of market participant of data indicative of a change in state of an electronic marketplace, e.g. an order book, for one or more financial products. The reporting/communications may be in the form of one or more financial messages communicated to the plurality of market participants via the network 214 which, as described above, may be the network 420 described below or network 124 or 126 described above, which may be implemented as a market data module 112 as described above. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed messages may be delivered by an open message standard implementation, such as FIX or FIX/FAST, or by an Exchange-provided API.

The system 200 includes a processor 202 and a memory 204 coupled therewith which may be implemented a processor 402 and memory 404 as described below with respect to FIG. 4. The system 200 further includes first logic 206 stored in a memory 204 and executable by a processor 202 to cause the processor 202 to determine, that, based on receipt of a request for a transaction, e.g. via a network 214 coupled therewith, the current state of the electronic marketplace has changed; second logic 208 stored in the memory 204 and executable by the processor 202 to cause the processor 202 to generate based on the determination that the current state of the electronic marketplace has changed, data indicative of the change in the current state of the electronic marketplace for inclusion in one or more electronic reporting messages to be communicated to the plurality of market participants, e.g. via the network 214; third logic 210 stored in the memory 204 and executable by the processor 202 to cause the processor 202 to store at least the generated data in the memory 204, or a different memory (not shown), coupled with the processor 202; fourth logic 212 stored in the memory 204 and executable by the processor 202 to cause the processor 202 to determine whether the change in the current state of the electronic marketplace will or will not cause a market participant of the plurality of market participants to submit a subsequent transaction request to the electronic marketplace; and fifth logic 214 stored in the memory 204 and executable by the processor 202 to cause the processor 202 to, wherein if it is determined that the change in the current state of the electronic marketplace will not cause a market participant to submit a subsequent transaction request to the electronic marketplace, repeating, for a subsequently received request for a transaction, execution of the first, second, third and fourth logic 206, 208, 210, 212 wherein if any of the subsequently generated data is determined to be an update to any of the previously generated data stored in the memory 214, the outdated previously generated data is replaced thereby in the memory 214; and wherein if it is determined that the change in the current state of the electronic marketplace will cause a market participant to submit a subsequent transaction request to the electronic marketplace, causing, by the processor 202, one or more electronic reporting messages comprising at least a subset of the stored data to be transmitted to the plurality of market participants and removed from the memory 214.

Each of the first, second, third, fourth, or fifth logic 206, 208, 210, 212, 214 may be implemented as a separate hardware component or as logic stored in the memory 204 and executable by the processor 202 to cause the processor 202 to function as described.

Figure 3:
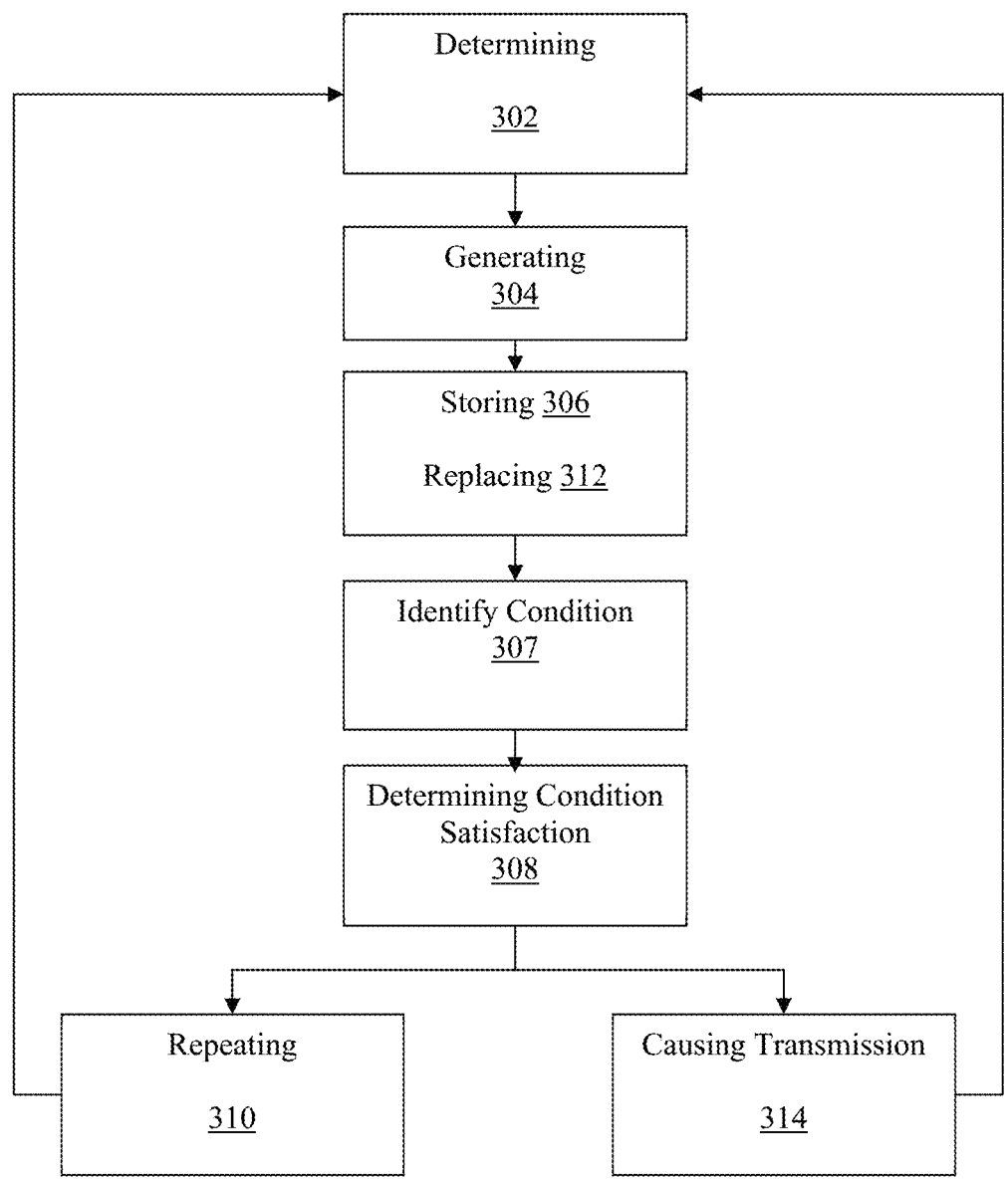
FIG. 3 depicts a flow chart showing operation of the system of FIGS. 1 and 2.

As shown in FIG. 3, the operations of the system 200 of the market data module 112, according to the disclosed embodiments, to manage reporting to a plurality of market participants of data indicative of a change in state of an electronic marketplace for one or more financial products includes: determining, by a processor 202, that, based on receipt of a request for a transaction, the current state of the electronic marketplace has changed [Block 302]; generating, by the processor 202 based on the determination that the current state of the electronic marketplace has changed, data indicative of the change in the current state of the electronic marketplace for inclusion in one or more electronic reporting messages to be communicated to the plurality of market participants [Block 304]; storing, by the processor 202, at least the generated data in a first memory 204 coupled with the processor 202 [Block 306]; identifying by the processor, a dynamic condition for publication of data indicative of the change of the current state of the electronic marketplace, the dynamic condition generated as a function of the change, the current state, and historical electronic marketplace data stored in a first memory coupled with the processor [Block 307]; determining, by the processor 202, whether the dynamic condition has been satisfied [Block 308]; and wherein if it is determined that the dynamic condition has not been satisfied, repeating [Block 310], for a subsequently received request for a transaction, the determining, generating and storing wherein if any of the subsequently generated data is determined to be an update to any of the previously generated data stored in the memory, the outdated previously generated data is replaced thereby in the memory [Block 312]; and wherein if it is determined that the dynamic condition has been satisfied, causing, by the processor 202, one or more electronic reporting messages comprising at least a subset of the stored data to be transmitted to the plurality of market participants and removed from the memory 204 [Block 314].

At Block 302, the processor 202 determines that the current state of the electronic marketplace has changed. The current state of the electronic marketplace may be changed as a result of matching or allocating a received transaction request with one or more resting orders in the electronic marketplace. Outstanding (unmatched, wholly unsatisfied/unfilled or partially satisfied/filled/completed) orders are maintained in one or more data structures or databases referred to as "order books," such orders being referred to as "resting," and made visible, i.e., their availability for trading is advertised, to the market participants through electronic notifications/broadcasts, referred to as market data feeds. An order book/data structure may be typically maintained for each product, e.g. instrument, traded on the electronic trading system and generally defines or otherwise represents the state of the market for that product, i.e. the current prices at which the market participants are willing buy or sell that product.

The operation of the system 200 includes wherein the change in current state is indicative that an attempt to match an incoming order received from one of the plurality of market participants for at least one transaction for the one or more financial products with at least one previously received but unsatisfied order for a transaction counter thereto resulted in at least partial satisfaction of one or both of the incoming order or the at least one other previously received order.

The operation of the system 200 includes wherein the generated data comprises at least a first portion and a second portion, wherein the first portion comprises first data identifying each of the one or more financial products transacted as a result of the at least partial satisfaction of one or both of the incoming order or the at least one previously received but unsatisfied order, and the second portion comprises second data enumerating each of the incoming order and at least one previously received but unsatisfied orders that were at least partially satisfied.

In addition to or alternatively, an incoming transaction request may be implied in whole or in part into a different order book. The financial instruments which are the subject of the orders to trade, may include one or more component financial instruments. While each financial instrument may have its own order book, i.e. market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. For example, an order for a volatility options quoted contract may be matched against another suitable order for that contract. However, it may also be matched against suitable separate counter orders for the premium quoted options or futures found in their respective order books (both the premium quoted and the volatility quoted being related to another using a pricing model). This is referred to as "implication" where a given order for a financial instrument may be matched via a combination of suitable counter orders for instruments which share common, or otherwise interdependent, financial variables.

The order for a particular instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

In general, advertising implied opportunities will encourage traders to enter the opposing orders to trade with them. The more implied opportunities that the match engine of an electronic trading system can calculate/derive, the greater this encouragement will be and the more the Exchange will benefit from increased transaction volume. Implied opportunities and implied matching, however, may increase the quantity of changes to electronic marketplaces and resulting reporting data. Without implication, a received order may only result in a change of a single order book. With implication, such as through triangulation, a received order may result in changes to multiple order books. The system 200, at block 304 below may generate data indicative of the change of each of the multiple order books. Each change may be compared against a specific condition for publication for the specific order book. For example, a received transaction may result in a change to multiple order books, yet only change data for a subset of the multiple order books may be published. Different order books may receive different volumes of transactions (or size of transactions), or may react differently. As such, different order books may generate different volumes of reporting data. Similar reporting data for different order books may also generate different reactions from market participants.

At Block 304, the processor 202 generates data indicative of the change to the current state of the electronic marketplace. The data indicative of the change may include data that provides a view or overview of the electronic marketplace as described above for a market data feed. The data indicative of the change may include data relating to the entire/current state of a market, or portion thereof. The data indicative of the change may be aggregated with previously generated data. For example, generated data may or may not be published depending on whether or not a condition is satisfied. When a condition is not satisfied, the generated data may be stored until a future condition is satisfied. In an embodiment, portions or the entirely of previously generated data may be selectively aggregated with newly generated data indicative of the change or changes over time to the current state of the electronic marketplace. The processor 202 may determine whether previously generated data may be replaced, removed and/or aggregated with new or more recent generated data.

At Block 306, the processor 202 stores the at least the generated data in a memory coupled with the processor 202. The generated data may be stored in a format for a market data feed or a market reporting message. The generated data may thus be transmitted to the plurality of market participants without further processing if the dynamic condition is satisfied. Alternatively, the generated data may be stored in a raw format and wait for the dynamic condition to be satisfied to be transmitted. In an embodiment, the generated data may be aggregated and stored with other previously generated data. For example, if the dynamic condition is not satisfied, portions or the entirely of the generated data may be held over until another transaction request is received. The portions or entirely of the generated data may be combined with the newly generated data.

At Block 307, the processor 202 identifies a condition for publication of the data indicative of the change. The condition may be based on the current state of the electronic marketplace, the change, and historical electronic marketplace data. The condition may be derived from a model that predicts when the generated data is to be published. The output of the model (e.g. whether to publish or not) may be based on one or more inputs such as the current state, the change, the available bandwidth, participant parameters, external parameters, environmental parameters, or other quantifiable data.

In an embodiment, the condition may require that a probability of at least one of the one or more electronic reporting messages to be communicated to the plurality of market participants causing at least one of the plurality of market participants to submit a transaction request to the electronic marketplace exceeds a threshold value. The threshold value may be calculated as a function of the available bandwidth. For example, if there is a large amount of free bandwidth for transmission, the threshold may be set low (e.g. a low probably still allows for publication). If there is a small amount of free bandwidth available, the threshold may be set high, limiting the publication to only those changes that are more likely than not to cause a market participant to submit a transaction request.

The probability may be computed based on historical analysis of previously submitted transaction requests and the changes in the state of the electronic marketplace caused thereby. The probability may be computed based on statistical analysis or machine learning techniques. Statistical analysis or decision trees may be used to identify statistical similarity quickly between the current state data, change data, and historical data by employing linear mathematical models or simple conditional logic. Data mining techniques may be use do identifying the probabilistic occurrence of a sequence of events with another in the historical data and prior change data.

Advanced modeling systems may be used, such as regression analysis or deep learning though neural networks to predict future actions as a result of publishing or not publishing the data indicative of the change. Regression analysis may be used for estimating the relationships among variables such as market factors, market parameters, market state, etc. to identify a type or magnitude of change that may generate future marketplace action when published. Regression analysis may be used to identify the strength of the relationship between two variables such as how the magnitude of change and time of the event is related to a future order. Regression takes a group of random variables, thought to be predicting an outcome, and tries to find a mathematical relationship between them.

A model may be generated using a neural network. The neural networks may include a collection of interconnected processing nodes. The connections between the nodes may be dynamically weighted. The neural network uses learning relationships through repeated exposure to the training data and adjustment of internal weights. The neural network allows for a quick model development and automated data analysis.

The training data for a machine learnt model may be acquired by recording the results of received transaction requests and identifying the outcome if the generated data is published. Each electronic marketplace may be trained using different data that is specific to the respective electronic marketplace. The data and inputs for the publication model may include previously submitted transaction requests and the changes in the state of the electronic marketplace caused thereby. The previously submitted transaction requests and changes may be stored in memory. As transactions requests are received and changes determined, future states of the marketplace may be recorded along with future submitted transaction requests. For example, a first transaction request may be received that causes a first change to the state of the marketplace. The first change may be published to market participants. The reaction from the market participants, e.g. if the first change invokes a second transaction request may be recorded and stored. Other market parameters or external parameters may be stored along with the first transaction, first change, and resulting actions. External parameters may include generated data from other electronic marketplaces, participant data, data relating to the entirely of the market, and event data among other data. The data along with other series of transactions/changes/resulting actions may be used to train the model for predicting the probability that a future transaction that causes a change in the electronic marketplace when published will invoke an action from a participant. The model may learn that certain transactions, even though the transaction cause a change in the electronic marketplace, do not result in an action by a participant when published. The change in the electronic marketplace may not satisfy the condition and, as such, is not published.

Additional parameters may be used in the model. Parameter values may be derived from the current state of the marketplace. Examples of derived values include "Greeks" which is a set of different measures/dimensions/variables of risk involved in taking a position in an option (or other derivatives). Each Greek, or particular measure of risk, is a result of an imperfect assumption or relationship of the option with another underlying variable. Various sophisticated hedging strategies are used to neutralize or decrease the effects of one or more of these measures of risk. Not all of these risk measures are important to all market participants and some are more important than others. With the exception of Vega (which is not a Greek letter), each measure of risk is represented by a different letter of the Greek alphabet. Greeks include

- $\Delta$ (Delta) represents the rate of change between the option's price and the underlying asset's price—in other words, price sensitivity;
- $\Theta$ (Theta) represents the rate of change between an option portfolio and time, or time sensitivity;
- $\Gamma$ (Gamma) represents the rate of change between an option portfolio's delta and the underlying asset's price—in other words, second-order time price sensitivity;
- $Y$ (Vega) represents the rate of change between an option portfolio's value and the underlying asset's volatility—in other words, sensitivity to volatility; and
- $\rho$ (Rho) represents the rate of change between an option portfolio's value and the interest rate, or sensitivity to the interest rate.

It will be appreciated that there may be other derived or computed values, now available or later developed, of interest to market participants which may be provided by the electronic trading system in a market data feed as described. In an embodiment, derived values from multiple electronic marketplaces may be used to train the publication model. For example, there may exist correlations between disparate electronic marketplaces such as how movements in one marketplace may predict movements in another. Additionally, with implied order and implied opportunities, many different electronic marketplaces may be linked, for example, through triangulation.

In an embodiment, the condition and publishing of data may be based at least in part on the availability of bandwidth. The exchange may be able to generate more data that can be transmitted thought the current network. In addition to the transmission limit, receiving participants may also be limited in the volume of data that may be accessed. For example, certain regions may have lower bandwidth limits than other regions. Bandwidth may also be limited for certain time periods of the day or week. The condition for publishing data may take into account the potential bandwidth limits. In an example, during peak trading hours, more transactions may be received and thus generate a greater volume of reporting data. Accordingly, the threshold for publishing the data may be set higher during this time period. The condition generating model may be taught when lulls occur and may generate the condition accordingly. The less bandwidth available, the more important the market data must be. The condition generating model may thus set a bar higher when less bandwidth is available and vice versa.

In an embodiment, the dynamic condition may be combined with a participant defined condition or a static condition. The operation of the system 200 further includes wherein the condition further comprises that the increase in quantity exceeds a threshold value. The operation of the system 200 further includes wherein the condition further comprises that a rate at which the quantity is increasing exceeds a threshold value. The operation of the system 200 further includes wherein the condition comprises that an amount of time has elapsed. The operation of the system 200 further includes wherein the condition comprises that a particular time of day has occurred. The operation of the system 200 further includes wherein the condition comprises that a number of occurrences of the current state of the electronic market place having changed [book values] exceeds a threshold value. The operation of the system 200 further includes wherein the one or more conditions of the electronic marketplace comprise performance, volatility, volume, throughput, the occurrence of a specified economic event, or combinations thereof. The operation of the system 200 further includes wherein the condition comprises that a quality [or score] of at least one of the one or more electronic reporting messages to be communicated to the plurality of market participants exceeds a threshold value. The operation of the system 200 further includes wherein the condition comprises that a trend of an overall marketplace for a tradeable object implemented by the electronic marketplace has changed. The operation of the system 200 further includes wherein the condition further comprises that an upward trend has turned downward. The operation of the system 200 further includes wherein the condition further comprises that the downward trend has continued for at least a threshold amount of time.

At Block 308, the processor 202 determines if the condition for publication has been satisfied. Satisfaction of the condition may be a binary event, e.g. the condition is either satisfied or not. Alternatively, the condition may be partially satisfied. In an embodiment, multiple sub conditions may be presented for satisfaction prior to publication. One condition may relate to the model described above in Block 307; One condition may relate to the current state of the network; One condition may relate to a specific market participant; etc. Each of or a combination of the sub conditions may be required to be satisfied before the processor 202 determine that the condition for publication has been satisfied. In an example, the model for determining publication may not take into account the available bandwidth at the time of the order. The model may further predict the availability of bandwidth in the future based on previous events.

If it is determined that the dynamic condition has been satisfied, the processor 202 transmits one or more electronic reporting messages comprising at least a subset of the stored data to the plurality of market participants. The generated data may be removed from the memory 204. The dynamic condition may be satisfied in a plurality of ways. Based on which of the plurality of ways the dynamic condition was satisfied, different subsets of the stored data for which the one or more electronic reporting messages may be transmitted. For example, a dynamic condition may be partially satisfied in that publishing a change may lead to a new transaction request from a market participant. However, a bandwidth condition may not be satisfied. In such a scenario, only a portion of the stored data may be transmitted, providing an update to a market feed, but limiting the amount of data transmitted.

In an embodiment, the subset of stored data further comprises only the stored data indicative of the change in the current state of the electronic market place. Alternatively, the subset of stored data is determined based at least on preference specified by a recipient of the one or more electronic reporting messages.

The electronic reporting message generated and transmitted may take various forms. The electronic reporting message may take the form of a report of the specific change to the order book, e.g. an order for quantity X at price Y was added to the book (referred to as a Market By Order message), or may simply report the result, e.g. price level Y is now has 5 orders for a total quantity if Z (where Z is the sum of the previous resting quantity plus quantity X of the new order) (referred to as a Market By Price message).

If the dynamic condition has not be satisfied, the generated data is not transmitted. The generated data may be replaced, deleted or overwritten if the new generated data from the new transaction request triggers a specific condition and is published. Alternatively, the generated data may be aggregated into a new reporting message. The new reporting message may wait for a subsequent action and subsequent satisfaction of a condition in order to be published. If the data is to be replaced, the reporting message with the old data may be removed from memory and the new message is stored in memory. If the data is to be aggregated, the message with the old data is removed from memory and an updated message is generated utilizing data from the new message and the old message that was in the memory. The updated message is then store in memory. The new message and the updated message may be placed in the memory at the location of the old data or at the location of the newer or more recent data.

In an embodiment, the satisfaction or partial satisfaction of the dynamic condition may result in no publication of the generated data. Instead, the generated data may be stored until another transaction request is received. The generated data and data from new transaction request may together trigger a condition for publication. Alternatively, the generated data may be deleted or overwritten if the new generated data from the new transaction request triggers a specific condition and is published.

In an embodiment, the system 200 may pre-calculate conditions prior to receiving the request. For example, given the state of the electronic marketplace prior to the receiving the request for a transaction, the system 200 may identify one or more changes to the state of the electronic marketplace that would result in the publishing of the generated data relating to the change.

The operation of the system 200 further includes wherein the storing further comprises generating and storing the one or more electronic reporting messages. The operation of the system 200 further includes wherein the condition may be satisfied in a plurality of ways, the method further comprising determining, based on which of the plurality of ways the condition was satisfied, an order in which the subset of stored data will be included in the one or more electronic reporting messages, an order in which the one or more electronic reporting messages will be transmitted, or combinations thereof.

The operation of the system 200 further includes wherein the condition comprises determining whether the change in the current state of the electronic market will, e.g. where the change is considered high priority/value or otherwise critical, or will not, e.g. the change is considered low priority/value or otherwise non-critical, cause a market participant to submit a subsequent transaction request to the electronic market place, the condition being satisfied when it is determined that the change in the current state of the electronic market will cause a market participant to submit a subsequent transaction request to the electronic market place. The operation of the system 200 further includes wherein the change the current state of the electronic marketplace comprises a change of a price of a tradeable object tradeable via the electronic marketplace, the condition comprising that the price has declined. The operation of the system 200 further includes wherein the condition further comprises that the decline in price exceeds a threshold value. The operation of the system 200 further includes wherein the condition further comprises that a rate at which the price is declining exceeds a threshold value. The operation of the system 200 further includes wherein the change the current state of the electronic marketplace comprises a change in an available quantity of a combination of two or more tradeable objects tradeable via the electronic marketplace, the condition comprising that the quantity has increased.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Figure 4:
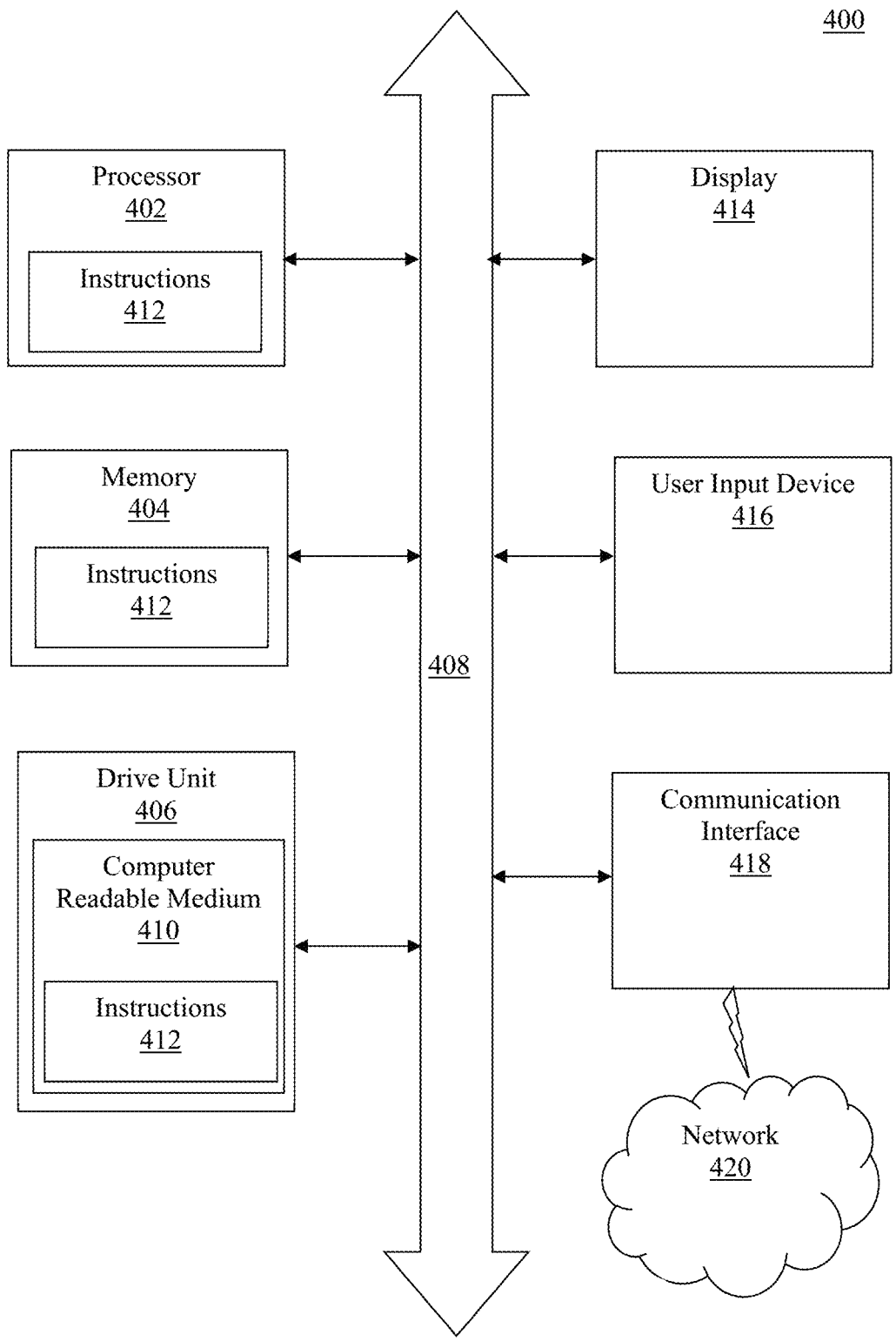
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for transmitting one or more reporting messages to a plurality of market participants via an electronic communications network when available bandwidth thereof is less than a threshold bandwidth amount, the one or more reporting messages each comprising data generated when a current state of an electronic marketplace changes and stored in a memory to await transmission, the method comprising:
   determining, periodically by a processor coupled with the memory and with the electronic communications network, the current available bandwidth thereof, and further determining that the current available bandwidth thereof is less than a threshold bandwidth amount;
   determining, by the processor, whether a dynamic condition for transmission of the stored data has been satisfied, the dynamic condition being satisfied by any of a plurality of factors meeting a threshold value determined at the time of the determining whether the condition has been satisfied; and
   wherein if it is determined that the dynamic condition has not been satisfied, causing, by the processor, the one or more electronic reporting messages comprising the stored generated data to not be transmitted until the current available bandwidth of the electronic communications network exceeds the threshold bandwidth amount and causing, by the processor, repeating, for a subsequent change in the current state of the electronic marketplace, the determining of the satisfaction of the dynamic condition wherein if any subsequently generated data is determined to be an update to any of the previously generated data stored in the memory, the previously generated data is replaced thereby in the memory; and
   wherein if it is determined that the dynamic condition has been satisfied, causing, by the processor, the one or more electronic reporting messages comprising at least a subset of the stored data to be transmitted to the plurality of market participants via the electronic communications network regardless of the current available bandwidth thereof being less than the threshold bandwidth amount, the transmitted subset being subsequently removed from the memory.

2. The computer implemented method of claim 1, wherein the change in current state is indicative that an attempt to match an incoming order received from one of the plurality of market participants for at least one transaction for the one or more financial products with at least one previously received but unsatisfied order for a transaction counter thereto resulted in at least partial satisfaction of one or both of the incoming order or the at least one other previously received order.

3. The computer implemented method of claim 2, wherein the generated data comprises at least a first portion and a second portion, wherein the first portion comprises first data identifying each of the one or more financial products transacted as a result of the at least partial satisfaction of one or both of the incoming order or the at least one previously received but unsatisfied order, and the second portion comprises second data enumerating each of the incoming order and at least one previously received but unsatisfied orders that were at least partially satisfied.

4. The computer implemented method of claim 1, wherein the one or more electronic reporting messages comprising the generated data are generated and stored in the memory for later transmission.

5. The computer implemented method of claim 1, the method further comprising determining, based on which of the plurality of the plurality of combinations of the plurality of factors satisfied the dynamic condition, which subset of stored data for which the one or more electronic reporting messages will be transmitted.

6. The computer implemented method of claim 1, the method further comprising determining, based on which of the plurality of the plurality of combinations of the plurality of factors satisfied the dynamic condition, an order in which the subset of stored data will be included in the one or more electronic reporting messages, an order in which the one or more electronic reporting messages will be transmitted, or combinations thereof.

7. The computer implemented method of claim 1, wherein the dynamic condition is determined to be satisfied when it is determined that the change in the current state of the electronic marketplace will cause a market participant to submit a subsequent transaction request to the electronic marketplace.

8. The computer implemented method of claim 7, wherein the subset of stored data further comprises only the stored data indicative of the change in the current state of the electronic marketplace.

9. The computer implemented method of claim 7, wherein the determining, by the processor, whether the condition is satisfied comprises that a probability of at least one of the one or more electronic reporting messages to be communicated to the plurality of market participants causing at least one of the plurality of market participants to submit a transaction request to the electronic marketplace exceeds a threshold value.

10. The computer implemented method of claim 9, wherein the probability is computed based on historical analysis of previously submitted transaction requests and the changes in the state of the electronic marketplace caused.

11. The computer implemented method of claim 1, wherein the subset of stored data is determined based at least on preference specified by a recipient of the one or more electronic reporting messages.

12. The computer implemented method of claim 1, wherein the outdated previously generated data is aggregated and stored with the subsequently generated data thereby in the memory.

13. The computer implemented method of claim 1, wherein determining, by the processor, whether the dynamic condition is satisfied is determined based on an analysis of previously submitted transaction requests and changes in the state of the electronic marketplace caused thereby.

14. The computer implemented method of claim 13, wherein previously submitted transaction requests and the changes in the state of the electronic marketplace comprise data relating to performance, volatility, volume, throughput, an occurrence of a specified economic event, or combinations thereof.

15. The computer implemented method of claim 13, wherein the analysis comprises a machine learnt model of the previously submitted transaction requests and the changes in the state of the electronic marketplace caused.

16. The computer implemented method of claim 15, wherein the machine learnt model is trained using a neural network.

17. A system for transmission of one or more reporting messages to a plurality of market participants via an electronic communications network when available bandwidth thereof is less than a threshold bandwidth amount, the one or more reporting messages each comprising data generated when a current state of an electronic marketplace changes and stored in a memory to await transmission, the system comprising:
    first logic stored in a memory and executable by a processor to cause the processor to determine, periodically, the current available bandwidth of the electronic communications network, and further determine that the current available bandwidth thereof is less than a threshold bandwidth amount;
    second logic stored in the memory and executable by the processor to cause the processor to determine whether a dynamic condition for transmission of the stored data has been satisfied, the dynamic condition being satisfied by any of a plurality of factors meeting a threshold value determined at the time of the determination whether the condition has been satisfied; and
    third logic stored in the memory and executable by the processor to cause the processor to, wherein if it is determined that the dynamic condition has not been satisfied, cause the one or more electronic reporting messages comprising the stored generated data to not be transmitted until the current available bandwidth of the electronic communications network exceeds the threshold bandwidth amount and cause, for a subsequent change in the current state of the electronic marketplace, execution of the second logic wherein if any subsequently generated data is determined to be an update to any of the previously generated data stored in the memory, the previously generated data is replaced thereby in the memory; and
    fourth logic stored in the memory and executable by the processor to cause the processor to, wherein if it is determined that the dynamic condition has been satisfied, cause the one or more electronic reporting messages comprising at least a subset of the stored data to be transmitted to the plurality of market participants via the electronic communications network regardless of the current available bandwidth thereof being less than the threshold bandwidth amount, the transmitted subset being subsequently removed from the memory.

18. The system of claim 17, wherein the change in current state is indicative that an attempt to match an incoming order received from one of the plurality of market participants for at least one transaction for the one or more financial products with at least one previously received but unsatisfied order for a transaction counter thereto resulted in at least partial satisfaction of one or both of the incoming order or the at least one other previously received order.

19. The system of claim 18, wherein the generated data comprises at least a first portion and a second portion, wherein the first portion comprises first data identifying each of the one or more financial products transacted as a result of the at least partial satisfaction of one or both of the incoming order or the at least one previously received but unsatisfied order, and the second portion comprises second data enumerating each of the incoming order and at least one previously received but unsatisfied orders that were at least partially satisfied.

20. The system of claim 17, wherein the one or more electronic reporting messages comprising the generated data are generated and stored in the memory for later transmission.

21. The system of claim 17, wherein the third logic is further executable by the processor to cause the processor to determine, based on which of the plurality of the plurality of combinations of the plurality of factors satisfied the dynamic condition, which subset of stored data for which the one or more electronic reporting messages will be transmitted.

22. The system of claim 17, wherein the third logic is further executable by the processor to cause the processor to determine, based on which of the plurality of the plurality of combinations of the plurality of factors satisfied the dynamic condition, an order in which the subset of stored data will be included in the one or more electronic reporting messages, an order in which the one or more electronic reporting messages will be transmitted, or combinations thereof.

23. The system of claim 17, wherein the dynamic condition is determined to be satisfied when it is determined that the change in the current state of the electronic marketplace will cause a market participant to submit a subsequent transaction request to the electronic marketplace.

24. The system of claim 17, wherein the outdated previously generated data is aggregated and stored with the subsequently generated data thereby in the memory.

25. The system of claim 17, wherein the determination of whether the dynamic condition is satisfied is based on an analysis of previously submitted transaction requests and changes in the state of the electronic marketplace caused thereby.

26. The system of claim 25, wherein previously submitted transaction requests and the changes in the state of the electronic marketplace comprise data relating to performance, volatility, volume, throughput, an occurrence of a specified economic event, or combinations thereof.

27. The system of claim 25, wherein the analysis comprises a machine learnt model of the previously submitted transaction requests and the changes in the state of the electronic marketplace caused.

28. The system of claim 27, wherein the machine learnt model is trained using a neural network.

29. A system for transmitting one or more reporting messages to a plurality of market participants via an electronic communications network when available bandwidth thereof is less than a threshold bandwidth amount, the one or more reporting messages each comprising data generated when a current state of an electronic marketplace changes and stored in a memory to await transmission, the system comprising:
  means for determining, periodically, the current available bandwidth of the electronic communications network, and further determining that the current available bandwidth thereof is less than a threshold bandwidth amount;
  means for determining whether a dynamic condition for transmission of the stored data has been satisfied, the dynamic condition being satisfied by any of a plurality of factors meeting a threshold value determined at the time of the determination whether the condition has been satisfied; and
  wherein if it is determined that the dynamic condition has not been satisfied, means for causing the one or more electronic reporting messages comprising the stored generated data to not be transmitted until the current available bandwidth of the electronic communications network exceeds the threshold bandwidth amount and means for causing, for a subsequent change in the current state of the electronic marketplace wherein if any subsequently generated data is determined to be an update to any of the previously generated data stored in the memory, the previously generated data to be replaced thereby in the memory; and
  wherein if it is determined that the dynamic condition has been satisfied, means for causing, by the processor, the one or more electronic reporting messages comprising at least a subset of the stored data to be transmitted to the plurality of market participants via the electronic communications network regardless of the current available bandwidth thereof being less than the threshold bandwidth amount, the transmitted subset being subsequently removed from the memory.

* * * * *